US006224777B1

(12) United States Patent
Iannicelli

(10) Patent No.: US 6,224,777 B1
(45) Date of Patent: May 1, 2001

(54) CONTINUOUS FILAMENT MATRIX FOR MAGNETIC SEPARATOR

(75) Inventor: Joseph Iannicelli, Jekyll Island, GA (US)

(73) Assignee: Aquafine Corporation, Brunswick, GA (US)

( * ) Notice: Subject to any disclaimer, the term of this patent is extended or adjusted under 35 U.S.C. 154(b) by 0 days.

(21) Appl. No.: 09/588,569

(22) Filed: Jun. 7, 2000

Related U.S. Application Data

(62) Division of application No. 09/252,479, filed on Feb. 18, 1999.

(51) Int. Cl.[7] ............................ B01D 35/06; B03C 1/02

(52) U.S. Cl. ......................... 210/695; 210/222; 210/223; 209/223.1; 209/231; 209/232

(58) Field of Search ................................. 210/222, 695, 210/223, 456; 209/223.1, 224, 231, 232; 335/300, 301, 302, 306; 505/892

(56) References Cited

U.S. PATENT DOCUMENTS

| | | | |
|---|---|---|---|
| 3,770,629 | 11/1973 | Nolan . | |
| 4,046,681 * | 9/1977 | Marston et al. | 210/222 |
| 4,079,002 | 3/1978 | Iannicelli . | |
| 5,004,539 * | 4/1991 | Colwell, Jr. | 210/222 |
| 5,668,518 | 9/1997 | Carner . | |
| 5,743,410 | 4/1998 | Stadtmuller . | |
| 5,759,391 | 6/1998 | Stadtmuller . | |

FOREIGN PATENT DOCUMENTS

| | | |
|---|---|---|
| 0 38 26 480 | 7/1989 | (DE) . |
| 0 793 989 A1 | 9/1997 | (EP) . |
| 1 576 158 | 10/1980 | (GB) . |
| 2 170 732 | 8/1986 | (GB) . |
| 3-229603 | 10/1991 | (JP) . |
| 7-132207 | 5/1995 | (JP) . |

OTHER PUBLICATIONS

The Cryofilter Series, "Superconducting High–Gradient Magnetic Separator (HGMS)" (no date).

Search Report from UK Application No. 9927130.6 dated May 30, 2000.

* cited by examiner

*Primary Examiner*—David A. Reifsnyder
(74) *Attorney, Agent, or Firm*—Banner & Witcoff, Ltd.

(57) ABSTRACT

A matrix separation element for use in magnetic separation devices is produced by winding stainless steel filament around a porous mandrel at a controlled tension. Controlling the tension on the filament produces a matrix separation element having a uniform, predetermined density. Further compression of the filament is not necessary. The tension may be controlled by varying the rotational velocity of the mandrel and/or the filament supply spool during winding. The matrix separation element preferably is used in a radial flow canister magnetic separation apparatus, but also may be used in axial flow and in multi-axial flow magnetic separation devices.

5 Claims, 3 Drawing Sheets

CONTINUOUS FILAMENT MATRIX FOR MAGNETIC SEPARATOR

CROSS REFERENCE TO RELATED APPLICATION

This application is a divisional of application Ser. No. 09/252,479, filed Feb. 18, 1999, now allowed the disclosure of which is incorporated by reference herein.

FIELD OF THE INVENTION

This invention relates to magnetic separation devices, in particular to the type of device in which magnetizable particles are removed from a stream of material by feeding the stream on or through stationary magnetic material, the magnetizable particles being held or "tapped" by the magnetic material and then extracted from the stream.

BACKGROUND OF THE INVENTION

One form of magnetic separation device which functions by magnetizable particle entrapment is generally referred to as a High Gradient Magnetic Separator or HGMS. An HGMS comprises a liquid-permeable, cylindrical canister containing liquid-impermeable packing elements of magnetizable material between the canister inlet and outlet. The packing material may be paramagnetic or ferromagnetic and may be in particulate or filamentary form, for example, it may comprise wire wool, wire mesh, knitted mesh, or steel balls. The packing may be in the form of a single block which essentially fills the canister or it may be in other forms, for example, concentric cylinders or rectangular plates. The term "matrix" is generally employed to refer to the packing. The term is used by some in the industry to refer to the totality of the packing; however it is commonly used, as herein, to refer to individual elements of the packing (i.e. concentric cylinders, rectangular plates, etc.).

The canister is surrounded by a magnet which serves to magnetize the matrix contained therein, the magnet generally being arranged to provide a magnetic field in the direction of the cylindrical canister axis. With the matrix magnetized, a slurry of fine mineral ore, for example clay dispersed in water, is fed into the inlet of the canister. As the slurry passes through the canister, the magnetizable particles in the slurry are magnetized and captured on the matrix. Eventually, the matrix becomes substantially filled with magnetizable particles and the rate of capture decreases so that the quantity of magnetizable particles in the treated slurry leaving the outlet of the canister reaches an unacceptably high level. The slurry feed is then stopped and the canister matrix rinsed with water to remove all non-magnetic material from the matrix. During the wash step, the magnetic field acting on the matrix is reduced to a sufficiently low value to enable the magnetizable material to be washed off the matrix elements with a high speed stream of water. The magnetic field may be reduced by de-energizing the magnet. HGMS systems operated in this way are referred to as switched HGMS systems.

It is generally recognized that de-energizing, washing, and subsequent re-energizing is, however, inefficient as regards cycle time and power consumption. Accordingly, an arrangement has been developed in which the magnet does not have to be de-energized to permit matrix regeneration. Instead, two matrix canisters are provided and moved alternately into the magnetic field of the separation zone. Thus, as one matrix canister is engaged in separation, the second can be flushed and the matrix regenerated. HGMS systems operated in this way are referred to as reciprocating canister HGMS systems or RCHGMS systems.

The magnetic field required for a switched HGMS or an RCHGMS can be provided by an electromagnet operating at ambient temperatures, a permanent magnet, or a superconducting magnet operating at cryogenic temperatures (cryogenic magnets). Cryogenic magnets for use with switched HGMS or a RCHGMS in industrial applications include a close coupled helium liquefaction system which has sufficient cooling power to maintain the magnet coil below the critical super-conducting temperature. The coil is held in a reservoir of liquid helium which may be surrounded by one or more radiation shields, the whole being contained in a cryostat vessel. The shields are maintained at low temperatures by refrigeration means which may include cooling pipes for circulating liquid nitrogen and/or cryocoolers. See, e.g., U.S. Pat. Nos. 5,743,410 and 5,759,391 to Stadtmuller.

A radial flow canister design is described in U.S. Pat. No. 4,079,002 to Iannicelli, the present applicant. Matrix elements, either rectangular elements spaced parallel to one other or annular elements spaced concentrically, are arranged within a highly intense magnetic field, and means are provided for establishing flow of the mixture to be separated in parallel flow paths through the matrices. The device may be used in both wet and dry separation processes. For example, the device is useful for separating particles of impurities from an aqueous slurry (for example, iron-mineral contaminates from an aqueous slurry of crude kaolin clay), for the purification of industrial minerals such as calcium and magnesium carbonates, asbestos, zircon, bentonite and talc, for the beneficiating of metal oxides, and for the treatment of coal (such as the removal of pyrites during desulfurizing). A major drawback of this configuration, however, is that cumbersome and difficult steps of placing and compressing the annular or rectangular mats are required to prepare the radial flow matrix.

The initial development and commercialization of stainless steel wool as a material for magnetic separator matrix elements involved manual packing of bundles of stainless steel tow into a canister to achieve a desired volume packing (usually 2 to 6%). This method suffered from the disadvantage that the matrix had a non-uniform density, which often created non-uniform flow through the matrix as the slurry passed preferentially through less-dense packing and voids. Furthermore, the matrix was susceptible to deformation and could be altered during high velocity flushing, making the method unreliable and unworkable for production-scale use.

Later developments involved the use of steel mats or felt made by laying down layers of steel wool tow, which could be obtained by scraping wire during its manufacture. The layers of tow wire were laid on a table and then interlocked by punching with needles with barbs resembling a straightened fish hook. Initially, the square mat was laid by shifting the orientation of alternate layers 90° before punching. This produced non-uniformities which were clearly apparent by holding up the layers to light. Subsequently, uniformity of the mat was significantly improved by laying rows of tow on a circular table matching the diameter of the finished pad. The table was rotated a given amount (30°, for example) after each row was laid. Building up the layers to about 0.5 inch produced a visually uniform mat after punching. Besides giving a more uniform and stronger mat, the table-made mat avoided wasted scrap because each layer of tow was matched to the diameter of the rotated table. In the orthogonal method, a square mat was laid down and cut into a circle when completed. The four comers were usually scrapped.

The mats so-produced, however, only contained about 2% steel wool by volume. In order to increase the density of the mats to the required 6 or 8% metal by volume, a stack of pads was compressed while in the canister by either placing weights (several tons) on the canister top or by using a hydraulic press capable of exerting 50 or more tons pressure. Unfortunately, such high compression of the matrix placed a high stress on the canister and often cracked the perforated plates of the design above and below the matrix. Indeed, the canister itself would frequently crack and leak. To achieve a matrix density of 6% following compression, a stack of about 100 pads had to be installed into the canister one or two at a time, which presented a risk of stretching and distorting the pads. The process also required hours of down time and at least three workers. Yet another disadvantage was the risk of injury to the workers from the compression process and from handling sharp steel wool.

Compression of the matrix against perforated plates additionally created corrosion problems at the interface of the steel wool pad and the perforated plate. Perforated plates at the entrance and exit of the canister perform two diverse functions in prior art HGMS units. First, perforated plates sandwich, compress, and restrain the steel wool matrix which has a spring back force of up to 50 tons for a large magnetic separator. Second, perforations in the plate serve to distribute flow of clay slurry or water across the cross-sectional area of a canister. A typical perforated plate consists of ¼ inch thick 430 stainless steel having a regular pattern of ¼ inch holes, giving about 50% open area. Slurry or water pumped from a plenum through the perforated plate enters the matrix as a series of small jets or streams. After flowing through several inches of steel wool matrix, these discrete streams coalesce into a uniform plug flow across the cross-sectional area of a canister. The non-plug flow space adjoining the matrix, both at the entrance and the exit of a canister, has dead spots and is difficult to clean of magnetizable products, non-magnetizable products, and minute debris present in the slurry.

As a result of this gradual accumulation of deposited particles in the first few inches of canister (equivalent to 6 or more layers of matrix), corrosion followed by partial plugging of the matrix occurs. This process is intensified by electrolytic action existing between the perforated plate and steel wool (even though they are of similar alloy composition) and the galvanic action between debris coatings and the matrix.

SUMMARY OF THE INVENTION

It is an object of the present invention to develop a matrix element for magnetic separation devices which is less expensive to manufacture than compressed pads of metal tow and more economical to install, or replace.

It is another object of the invention to provide a method of manufacturing matrix elements which have a density which either may be uniform throughout the mandrel or, if desired, varied predictively along the radius and/or the longitudinal axis of the mandrel.

It is yet another object of the invention to supply a matrix in one piece which can be readily stored, installed, and replaced, and which comprises a strong monolithic unit which is less subject to damage, thus eliminating the need for a strong perforated plate on the outside of the matrix.

According to the present invention, a continuous filament matrix magnetic separation apparatus includes parallel spaced, relatively thin matrix separation elements arranged within and oriented parallel, perpendicular, or oblique to a high intensity magnetic field, with means being provided to establish parallel flow paths for a fluid-particle mixture through the matrix elements.

The invention has particular utility in both wet and dry separation processes as, for example, in separating particles of impurities from an aqueous slurry (for example, iron-mineral contaminates from an aqueous slurry of crude kaolin clay), in the purification of industrial minerals such as calcium and magnesium carbonates, asbestos, zircon, bentonite and talc, in the beneficiating of metal oxides, and in the treatment of coal (such as the removal of pyrites during desulfurizing).

The matrix separation elements preferably are arranged in parallel spaced relation, with the longitudinal axis of the matrix element parallel to the longitudinal axis of a chamber contained in a housing, the housing including inlet and outlet openings at opposite ends of the chamber (FIG. 1). The matrix elements each comprise a stainless steel filament wound around a porous mandrel. The filament may be wound in the form of tow (i.e. bundles of filament). The matrix elements may be, for example, polygonal shaped and spaced parallel to one another or, more preferably, concentrically spaced annular elements. Preferably the housing and the chamber contained therein are cylindrical, with the means for establishing a magnetic field in the chamber including a coil arranged concentrically about the housing for establishing in the chamber a magnetic field, the flux of which passes longitudinally through the matrix elements.

The support mandrel of each matrix element may have disposed thereon barbs or splines and/or circular discs (rings) for stabilizing the matrix element against shifting when moved. The discs also are useful for channeling slurry or flush water streams normal to the mandrel. The outside surface of each of the matrix elements preferably is covered by a perforated plate, a perforated cylinder, or a screen.

Ferromagnetic pole pieces 30, 32 (FIG. 1) may be arranged within the housing chamber at opposite ends of the matrix elements for concentrating the flow of magnetic flux through the longitudinal axis of the matrix elements. Preferably the pole faces adjacent the ends of the matrix elements have projections for further concentrating the flow of magnetic flux through the matrix elements in the direction of the longitudinal axis of the matrix elements. In the case of parallel, spaced matrix elements, the pole face projections comprise linear ribs 30*a*, 32*a* (FIG. 1) opposite the matrix elements, and in the case of concentrically arranged annular matrix elements, the pole face projections comprise concentric annular ribs 230*a*, 232*a* (FIG. 5) opposite the matrix elements. If desired, the faces of the ribs adjacent the matrix elements may be serrated to further concentrate the magnetic flux in the matrix elements.

In accordance with the invention, matrix elements may be produced efficiently and without wasting steel wool. By controlling filament tension during winding, the matrix elements are pre-compressed to a desired density and thus do not require further compression. In addition, the density of the matrix elements is uniform or, if desired, selectively varied along the radius and/or the longitudinal axis of the mandrel. During manufacture, densities of the matrix elements may be increased or decreased simply by varying the tension on the tow material during winding. The matrix element is supplied as a strong, monolithic unit and readily is stored, installed, and replaced. Because of this increased strength, there is no need for a strong perforated plate on the outside of the matrix. Further, the orientation of matrix fibers on the mandrel may be varied predictively, and different types of stainless steel wool or other metal fibers may be co-wound to form the matrix.

The present invention allows rapid and facile replacement of matrix as pre-compressed modules and eliminates the present practice of manually loading and unloading matrix into or out of a canister several pads at a time and intermittently compressing the matrix stack. Because the matrix is pre-compressed during fabrication, an external compressing member on the matrix is not needed. The matrix also does not need a tightly clamped cylinder contacting it. Instead, an external light weight perforated cylinder, perforated plate, or screen can be used. Preferably, a small clearance is left between the outer perforated cylinder, perforated plate, or screen and the matrix, thereby increasing the magnetic gradient process slurry encounters upon contacting the matrix. The separation of the outer casing from the matrix also reduces dead spots at the entrance of the canister and eliminates or substantially reduces plugging and corrosion effects. The outer casing may be supported only at the ends of the matrix element, for example, to facilitate this separation.

The matrix of the present invention is a self-supporting structure, independent of the canister, and does not require an external restraining and partially shielding member to maintain the desired density. Slurry is uniformly distributed on entering the matrix so that the entire surface and volume of the matrix is available for maximum extraction of magnetizable particles. Separation efficiency for a given volume of matrix according to the invention is significantly greater than prior art methods where significant fouling occurs at the interface of the perforated plates and matrix elements. Flushing and cleaning of the matrix also are enhanced because of the less-obstructed flow of water. Thus, not only is magnetic separation efficiency improved, but flush water is conserved and dilution of clay slurry reduced.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION OF THE INVENTION

The matrix made in accordance with the invention preferably is used in combination with a radial flow canister in a magnetic separation apparatus as taught, for example, by Iannicelli, U.S. Pat. No. 4,079,002, incorporated by reference herein in its entirety. The matrix may also be employed in axial flow or in multi-axial flow canisters. An axial flow canister is taught, for example, by Nolan, U.S. Pat. No. 3,770,629, incorporated by reference herein in its entirety. Multi-axial flow canisters are described in Stadtmuller, U.S. Pat. Nos. 5,743,410 and 5,759,391, each of which is incorporated by reference herein in its entirety.

As used herein, the term "metal filament" refers to a substantially continuous, thread-like metal fiber having an average diameter (minimum thickness) of at least about 20 microns and preferably less than about 100 microns. The filaments typically have ribbon-like configurations, i.e. irregular cross-sections, and may be machined by scraping steel wire under tension with a series of serrated knives. The wires are displaced linearly with respect to and in contact with the "V" portion of the serrated knives, whereby strands (filaments) are cut sequentially from the steel wire by the series of knives.

The term "tow" refers to a bundle of filaments. Tow may be formed, for example, by scraping several (up to 10 or more) adjacent wires at a time in the manner described above. The filaments of the tow are generally continuous but may be discontinuous, for example, when there is a "break" between filaments or bundles of filament.

The terms "matrix," "matrix element," and "matrix separation element" refer to ferromagnetic separation elements which are highly permeable to fluids and particularly slurries and which are external to the applied magnetic field in the magnetic separation apparatus. The longitudinal axis (or longitudinal dimension) of the matrix element refers to the axis around which the tow is wound. The thickness dimension of the matrix element refers to the dimension normal to the longitudinal axis. The term "porous mandrel" refers to a mandrel which is liquid-permeable, i.e., having pores, perforations, or other openings to permit the passage of liquid.

Figure 1:
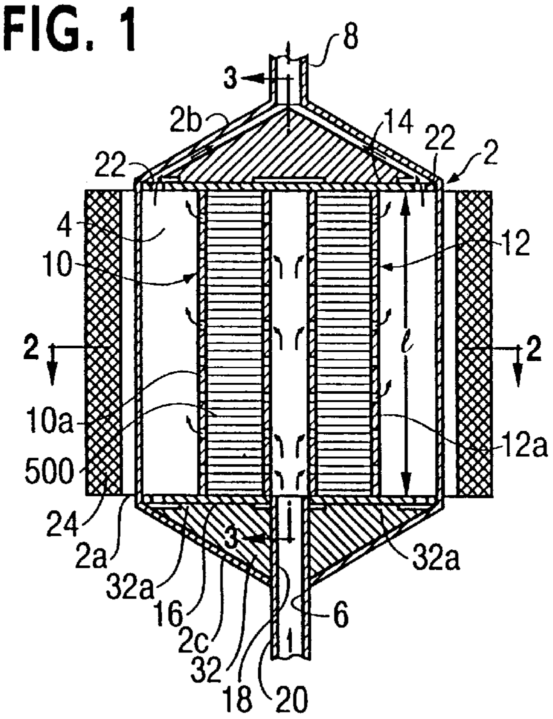
FIG. 1 is a longitudinal sectional view of an embodiment of the invention including a pair of parallel, spaced, planar polygonal matrix elements.
Figure 3:
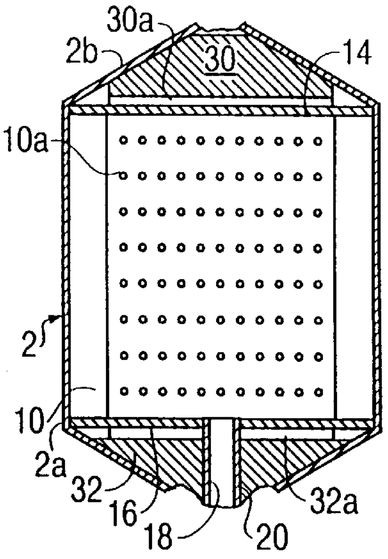
FIGS. 2 and 3 are sectional views taken along lines 2—2 and 3—3 of FIG. 1.
Figure 2:
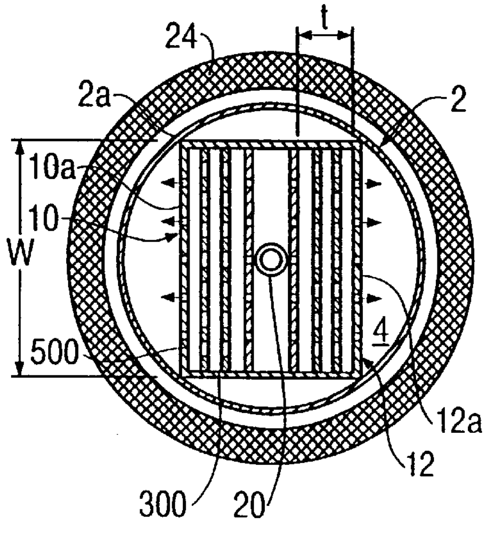

With reference to FIGS. 1–3, the magnetic separation apparatus of the invention preferably includes a cylindrical housing 2 which contains a cylindrical chamber 4 and includes at its lower and upper ends inlet 6 and outlet 8 openings, respectively. Mounted within the housing chamber 4 are a pair of matrix separator elements 10 and 12 which are of polygonal configuration. The matrix elements are arranged in spaced parallel relation with their length dimension 1 extending longitudinally of the housing chamber 4. Arranged at the upper and lower ends of the matrix elements are isolation plates 14 and 16 which isolate the housing chamber 4 from the inlet and outlet openings 6 and 8, respectively. The lower isolating plate 16 contains a central aperture 18 through which the mixture to be separated is supplied into the space between matrix elements 10 and 12. Similarly, the isolation plate 14 contains apertures 22 which afford communication between the spaces adjacent the remote surfaces of the matrix elements 10 and 12 and the housing outlet 8. Means including an annular coil 24 arranged concentrically about the housing are provided for establishing a high intensity magnetic field which extends longitudinally through the matrix elements 10 and 12 contained therein. In order to further concentrate the longitudinal flow of flux through the housing chamber 4, ferromagnetic pole pieces 30 and 32 are arranged at the upper and lower ends of the housing chamber in engagement with the isolating plate means 14 and 16. The pole pieces 30 and 32 preferably include linear rib portions 30*a* and 32*a*, respectively, that are arranged opposite and parallel with the matrix elements 10 and 12.

Each of the matrix elements 10 and 12 comprises stainless steel filaments 500 wound (in the form of tow) on a mandrel.

The mandrel may be, for example, a perforated, polygonal-shaped body, or may be in the form of a slotted screen or a rolled-up screen. A perforated canister 10*a* and 12*a* preferably covers the wound filament 500 of the matrix elements 10 and 12, respectively. A perforated plate or rolled-up screen may be used instead to cover the matrix elements.

As illustrated in FIGS. 1 and 2, the matrix elements 10 and 12 may be of a generally rectangular configuration, i.e., the tow may be wound on a mandrel having a rectangular cross-section. Other details of preparing the matrix elements will be discussed below.

Preferably the housing 2 includes separable cylindrical body and conical top and bottom pieces 2*a,* 2*b,* and 2*c,* respectively. The pole pieces 30 and 32 and the isolating plate means 14 and 16 are removably mounted in the housing chamber to permit access to the matrix elements 10 and 12 for servicing. The pole pieces 30 and 32 and the isolating plate means 14 and 16 are each formed of a suitable ferromagnetic material, and the remaining components (such as the housing 2, the mandrels 300, and the canisters 10*a* and 12*a*) are formed of a suitable non-ferromagnetic material, such as non-magnetic stainless steel. The high intensity magnetic field established in the housing chamber 4 by the coil 24 typically has an intensity of from about 7,000 to about 50,000 gauss, most often greater than 8,500 gauss.

During operation, the coil 24 may be energized to establish the high intensity magnetic field which extends longitudinally throughout the housing chamber 4 and the matrix elements 10 and 12. A mixture, for example an aqueous slurry of a crude kaolin clay dispersed in water, is supplied to the housing chamber 4 via supply conduit 20, inlet opening 6, and aperture 18. The mixture fills the space between the matrix elements 10 and 12 and then passes through the matrix elements in the direction of the thickness dimension thereof normal to the direction of the high intensity magnetic field, the flux of which passes longitudinally through the matrix elements. The mixture then fills the spaces between the remote surfaces of the matrix elements and the cylindrical wall surface of the chamber 4 and flows to the housing outlet 8 via the apertures 22 contained in the isolating plate 14. The magnetizable impurity particles contained in the slurry are retained by magnetic particle attraction on the wound filament 500 of the matrix elements 10 and 12. As illustrated in the drawings, the mixture flows in parallel flow paths in the thickness direction through the matrix elements transverse to the direction of the magnetic field which is directed longitudinally through the housing chamber 4.

The supply of mixture may be interrupted and the residue slurry rinsed from the apparatus by a gentle flow of water. The coil 24 then may be de-energized to interrupt the magnetic field and the flow of flux longitudinally through the matrix elements, whereupon water is forced through the matrix elements to flush the particles of impurities which are collected on the wound filament 500 of the matrix elements 10 and 12 out of the housing via outlet opening 8.

Figure 4:
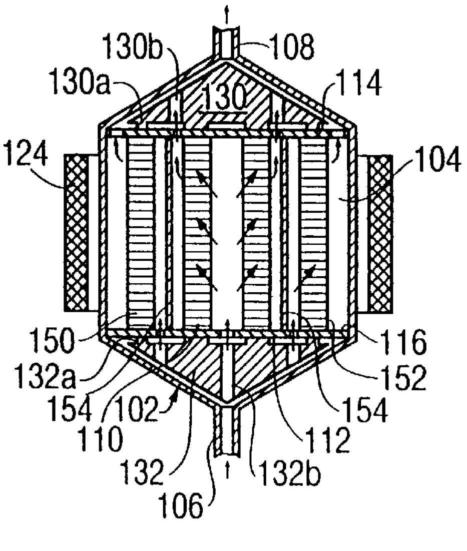
FIG. 4 is a sectional view of a modified embodiment of the invention including a plurality of parallel, spaced, planar polygonal matrix elements.

While only two parallel, spaced, relatively thin, polygonal matrix elements have been illustrated in the embodiment of FIGS. 1–3, it will be apparent that in accordance with the present invention, a plurality of parallel, spaced, polygonal matrix elements could be provided. As shown in FIG. 4, when a plurality of the polygonal matrix elements 110, 112, 150, and 152 are provided, non-ferromagnetic planar divider plates 154 preferably are provided in spaced, parallel relation between the matrix elements on opposite sides of the center line of the housing chamber 104. The isolating plates 114 and 116 preferably contain apertures which are so-arranged that the spaces on one side of the matrix elements communicate with the housing inlet opening 106, and the spaces on the other sides of the matrix elements communicate with the housing outlet opening 108. The pole pieces may be provided with corresponding, longitudinally extending passages to assist in the flow of the mixture through the apparatus. Thus, the mixture flows into the chamber 104 via the inlet opening 106 and the passages 132*b* and the apertures contained in the isolating plate 116 into the appropriate spaces on one side of the matrix elements. The mixture then flows in parallel paths in the thickness direction through the polygonal matrix elements in a direction transverse to the magnetic field established in the housing chamber 104 by the coil means 124, and out from the housing chamber via the apertures contained in isolating plate 114, passages 130*b,* and the outlet opening 108. As in the embodiment of FIGS. 1–3, the pole pieces 130 and 132 include pole faces which preferably are provided with projecting ribs 130*a* and 132*a* opposite the matrix elements, whereby the flow of magnetic flux is concentrated longitudinally through the matrix elements 110, 112, 150, and 152.

Figure 5:
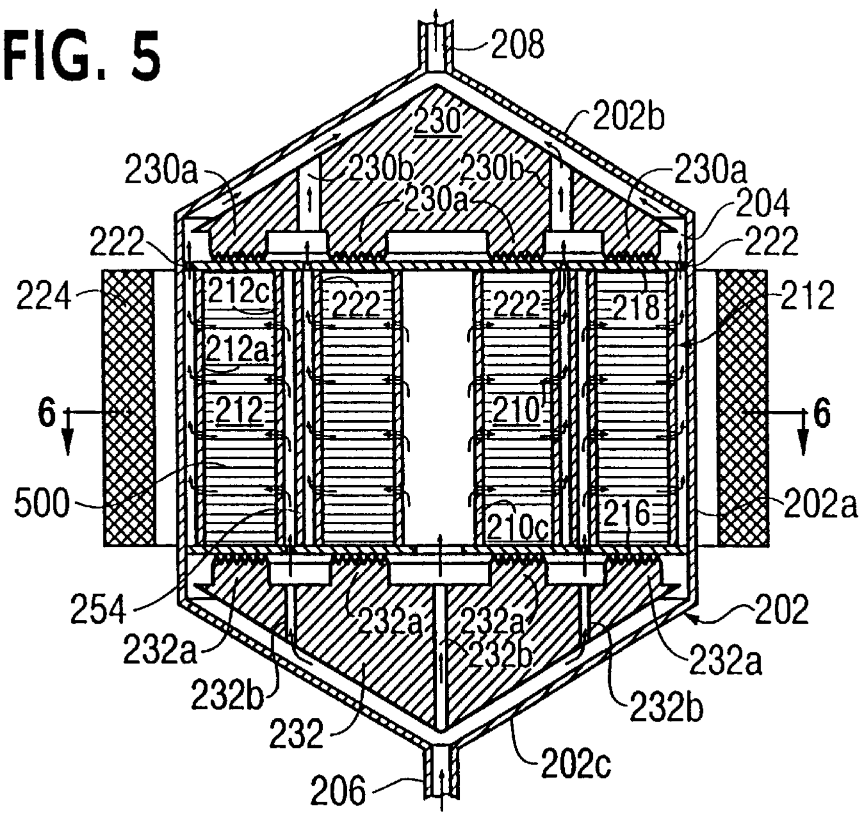
FIG. 5 is a longitudinal sectional view of a preferred embodiment of the invention including annular, concentrically spaced matrix elements.
Figure 6:
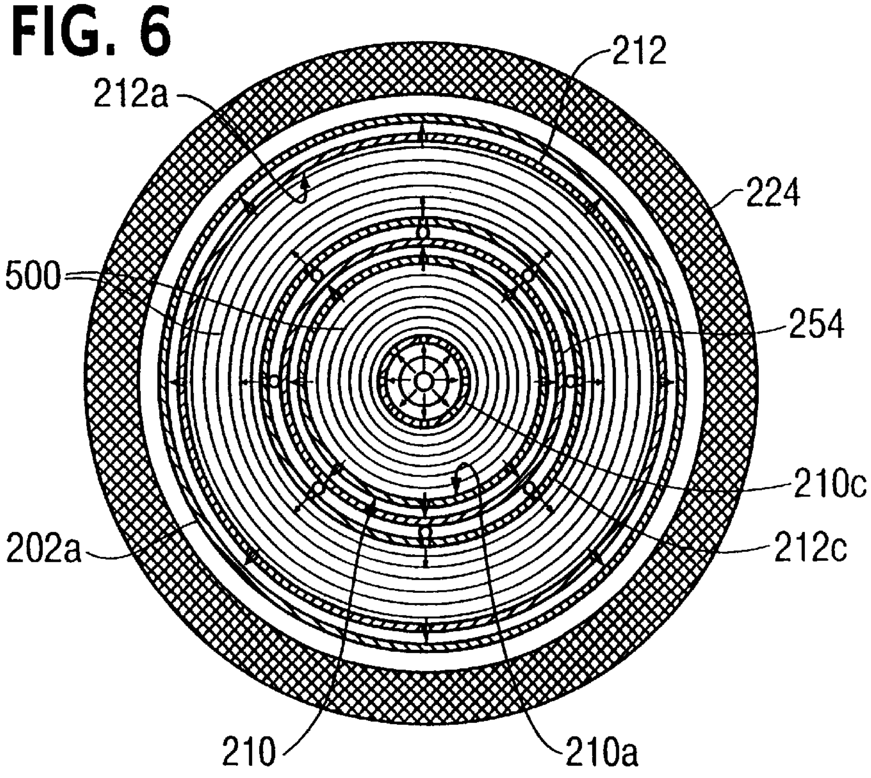
FIG. 6 is a sectional view taken along line 6—6 of FIG. 5.

In accordance with a preferred embodiment of the invention, the matrix elements are annular and are arranged in concentrically spaced relation within the housing chamber. More particularly, with reference to FIGS. 5 and 6, the housing 202 is of cylindrical construction and includes a cylindrical chamber 204 in which are arranged in concentrically spaced relation a pair of annular matrix elements 210 and 212. Arranged in concentrically spaced relation between the matrix elements is an annular, impervious separator plate 254 that is formed of a suitable non-ferromagnetic material, such as non-magnetic stainless steel. A lower isolating plate 216 formed of a suitable ferromagnetic material is provided containing apertures which afford communication between the spaces on one side of the matrix elements with the inlet opening 206, and an upper isolating plate 218 formed of a suitable ferromagnetic material containing apertures 222 which afford communication between the spaces on the other sides of the matrix elements with the housing outlet opening 208. To facilitate the flow of the mixture through the apparatus, the upper and lower ferromagnetic pole pieces 230 and 232 are provided with appropriate longitudinal passages 230*b* and 232*b,* respectively. In accordance with the present invention, means including the concentrically arranged annular coil 224 is provided for establishing a magnetic field that extends longitudinally through the housing chamber 204 and longitudinally through the matrix elements 210 and 212. In order to concentrate the flow of magnetic flux of the field longitudinally through the matrix elements 210 and 212, the faces of the pole pieces 230 and 232 preferably are provided with concentrically arranged, annular ribs 230*a* and 232*a,* respectively, opposite the matrix elements.

As in the previous embodiment, the matrix elements include stainless steel filament 500 wound on mandrels 210*c* and 212*c,* such as perforated cylinders. Preferably, a concentric, perforated cylinder 210*a* and 212*a* covers the wound filament 500 of each matrix element. Other details for preparing matrix elements are discussed below.

In operation, the mixture flows into the spaces on one side of the matrix elements in parallel flow paths from housing opening 206 via the longitudinal passages contained in the isolating plate 216. The mixture then flows through the pervious matrix elements 210 and 212, through the wound filament 500 in the thickness (radial) direction of the matrix elements transverse to the longitudinal (axial) magnetic field concentrated in the matrix elements, and outwardly through the perforated cylinders 210*a* and 212*a* of the matrix elements. The mixture then flows to the housing outlet 208 from the spaces on the outer sides of the matrix elements via apertures 222 contained in the upper isolating plate 218 and the longitudinal passages 230*b* contained in the upper pole piece 230 and also the space between the upper pole piece 230 and the housing upper end portion 202*b*.

While in both embodiments the inlet and outlet openings have been illustrated as being at the lower end and upper ends of the housing, respectively, it is apparent that the inlet and outlet openings might be reversed so that the mixture flows in the opposite direction through the separation apparatus. The actual number of planar, polygonal; concentrically arranged, annular; or differently shaped matrix elements may be greatly increased depending on the size of the separation apparatus. Preferably, the thickness dimension of each matrix element is less than about 10 inches.

As an alternative to the mode of operation described above, the supply of the mixture may be interrupted, whereupon the residual slurry is rinsed from the apparatus by a gentle flow of water. The water in the matrix elements then may be displaced with compressed air, the magnet de-energized, and the matrix elements flushed with water. Before re-starting the flow of mixture, it may be desirable to displace by means of compressed air the water remaining in the matrix elements from the flush step.

Figure 7:
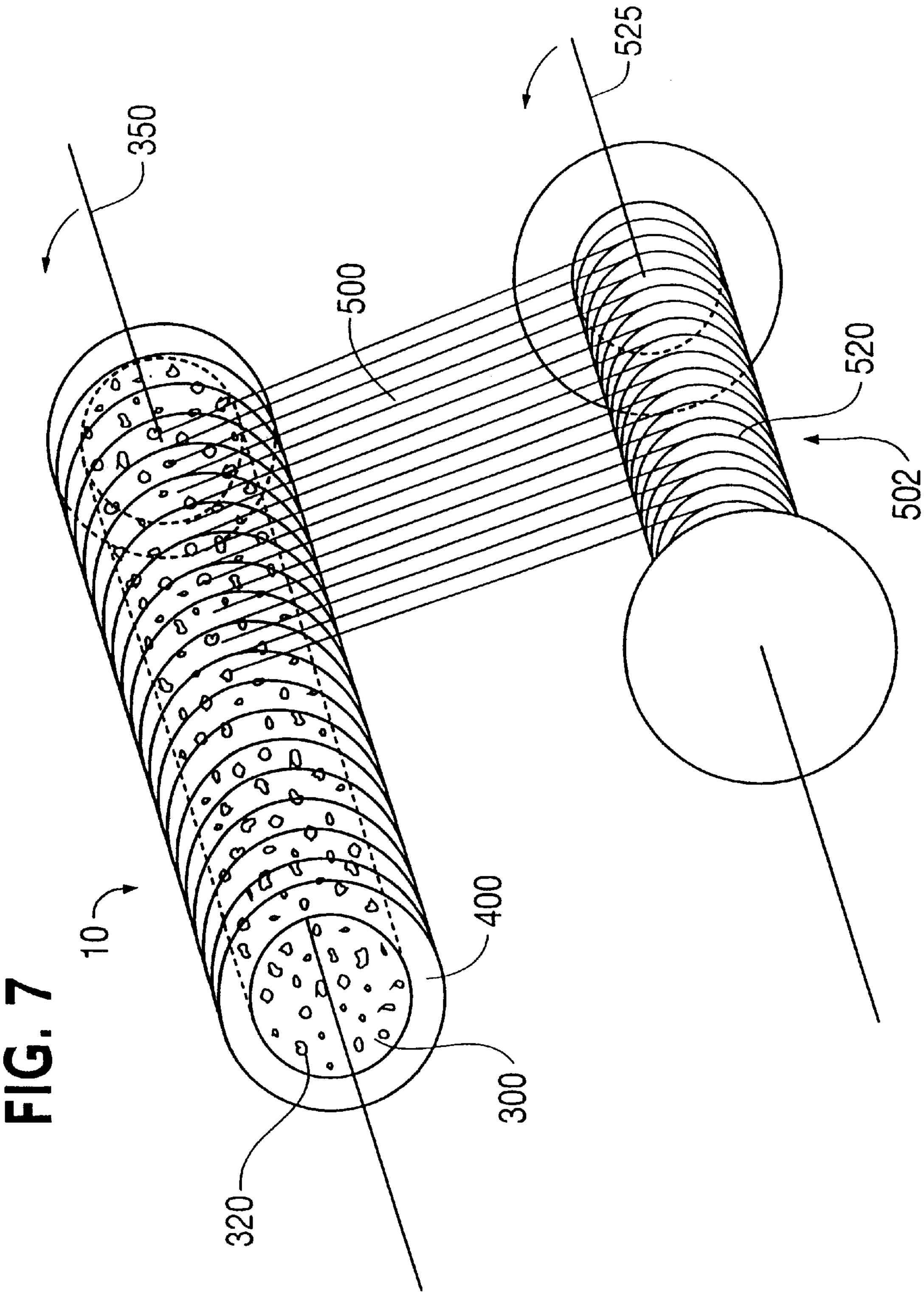
FIG. 7 is a schematic illustration of an assembly for winding a continuous, stainless steel tow on a mandrel in accordance with a preferred embodiment of the invention.

Next, a method for making a matrix element 10 in accordance with a preferred embodiment of the invention will be described in detail. With reference to FIG. 7, a matrix element 10 may be prepared by providing a supply 502 of stainless steel tow 500 on a spool 520 supported along its longitudinal axis on a rotating shaft 525 suitably connected to variable-speed drive means (not illustrated) for feeding the stainless steel tow at a first rate of speed. Suitable types of stainless steel wool which may be used to form the tow in the manner previously discussed include, for example, 410, 430, 440, and related magnetically soft stainless steels. An inner mandrel 300 for collecting the tow 500 is rotatably supported on a variable-speed drive shaft 350 along its longitudinal axis for rotating the mandrel 300 at a second rate of speed. The mandrel 300 may be a cylinder having perforations 320 which allow access, e.g. by slurry, to the matrix 10, for example, during operation in a radial flow canister. Additionally, the mandrel 300 may have barbs or splines (not illustrated) to stabilize matrix 10 when it is moved into and out of a magnetic field. The mandrel 300 preferably has circular discs 400 disposed perpendicular to the axis of the mandrel 300 for stabilizing the matrix against shifting when moved and for channeling slurry and flush water streams in a direction normal to the mandrel 300. Preferably, the matrix is covered by a slotted screen, a rolled-up screen, a perforated cylinder, or a perforated plate. A small clearance preferably is left between the covering member and the matrix, thereby increasing the magnetic gradient process slurry encounters upon contacting the matrix. Since the wound filament of the matrix is out of contact with the covering member, i.e., not used to compress the matrix as in the prior art, a light weight covering member may be used. The separation of the covering member from the wound filament also reduces dead spots at the entrance of the canister and substantially eliminates plugging and corrosion effects. The covering member may be supported only at the ends of the matrix element, for example, to facilitate this separation.

The density of the matrix 10 may be controlled by varying the tension on the tow 500 during winding. The tension on the tow 500 can be controlled, for example, by varying the rotational speed of the supply spool 520 via drive shaft 525 relative to the rotational speed of the mandrel 300 via drive shaft 350, i.e. by varying either or both of the first rate of speed of the supply spool 520 and the second rate of speed of the mandrel 300. As will be appreciated by those skilled in the art, a uniform matrix density may be obtained by maintaining a constant tension on the tow 500 during winding or, alternatively, the density of the matrix 10 may be varied predictively along the radius and/or the longitudinal axis of the mandrel 300 by varying the tension on the tow 500 during winding. The matrix thus formed is pre-compressed to a desired density, avoiding the need for further packing, pressing, or the like.

The density (represented as metal by volume percent) may range from about 1% to 10%, preferably from about 4% to about 8%, more preferably from about 5% to 7%, and most preferably is about 6%. The volume percent is calculated as the volume of the wound filament divided by the entire volume of the matrix element.

The winding path of the tow 500 may be controlled by shifting the relative longitudinal positions of the supply spool 520 and the mandrel 300 during winding. Suitable actuating means (not illustrated) may engage either or both of the supply spool 520 and mandrel 300 to affect this translational movement. For example, the supply spool 520 may translate along its longitudinal axis from left to right in FIG. 7 at a rate of speed which is slightly slower than the left-to-right translational speed of the mandrel 300. This causes winding of the tow filament 500 to proceed from right to left around the mandrel 300. Additionally, the orientation of the fibers may be varied predictively by controlling the winding path of the tow.

As will be appreciated by those skilled in the art, different types of stainless steel filaments or other metal fibers may be co-wound to form a matrix element having desired properties.

It will be apparent to those skilled in the art that various modifications and variations can be made in the articles of manufacture and methods of the present invention without departing from the spirit or scope of the invention. Thus, it is intended that the present invention cover the modifications and variations of this invention provided they come within the scope of the appended claims and their equivalents.

What is claimed is:

1. A process for separating from a fluid-particle mixture particles having a given degree of magnetic susceptibility relative to the magnetic susceptibility of remaining particles, the process comprising:

supplying the mixture to an inlet opening of a chamber containing at least one ferromagnetic matrix separation element, said at least one matrix separation element having a longitudinal axis and comprising stainless steel filament wound on a porous mandrel;

directing a high intensity magnetic field through said chamber in a direction parallel to the longitudinal axis of said at least one matrix separation element, whereby the direction of the magnetic field is normal, parallel, or oblique to a thickness dimension of said at least one matrix separation element;

causing said mixture to flow in parallel flow paths through said at least one matrix separation element in the direction of the thickness dimension thereof and thereafter out of said chamber through an outlet opening thereof, whereby the particles having a given degree of magnetic susceptibility are retained on said at least one matrix separation element.

2. The process of claim 1 further comprising:

rinsing residual mixture from the chamber;

interrupting the magnetic field; and flushing from said at least one matrix separation element the particles which are retained thereon.

3. The process of claim 1 wherein said chamber is cylindrical, and wherein a plurality of matrix separation elements are arranged in concentrically spaced relation within, and concentrically spaced from the cylindrical wall of, the chamber.

4. The process of claim 1 wherein stainless steel filament comprises stainless steel tow.

5. The process of claim 1 further comprising:

interrupting the mixture and rinsing the residual mixture from the chamber with a gentle flow of water;

introducing compressed air in the chamber to remove the remaining liquid therefrom; and flushing from said at least one matrix separation element the particles which are retained thereon.

* * * * *